United States Patent [19]

Yokoyama et al.

[11] Patent Number: 4,940,600

[45] Date of Patent: Jul. 10, 1990

[54] PROCESS FOR PRODUCING DRIED CHEESE

[75] Inventors: Hitoshi Yokoyama, Sennan; Hiroyuki Sano, Kishiwada; Akiko Horimoto; Masatoshi Kizaki, both of Sennan, all of Japan

[73] Assignee: Fuji Oil Company, Limited, Osaka, Japan

[21] Appl. No.: 136,635

[22] Filed: Dec. 22, 1987

[30] Foreign Application Priority Data

Dec. 23, 1986 [JP] Japan .............................. 61-314643
May 27, 1987 [JP] Japan .............................. 62-132271

[51] Int. Cl.$^5$ ............................................. A23C 19/00
[52] U.S. Cl. .................................. 426/582; 426/589
[58] Field of Search ............................ 426/582, 589

[56] References Cited

U.S. PATENT DOCUMENTS

| | | | |
|---|---|---|---|
| 1,997,866 | 4/1935 | Irvin | 426/456 |
| 2,289,576 | 6/1942 | Jordan | 426/582 |
| 3,962,483 | 6/1976 | Schulz | 426/582 |
| 4,349,576 | 9/1982 | Lehnhardt et al. | 426/582 |
| 4,552,774 | 11/1985 | Gronfor | 426/582 |

FOREIGN PATENT DOCUMENTS

| | | | |
|---|---|---|---|
| 1022382 | 12/1977 | Japan | 426/582 |
| 009138 | 2/1984 | Japan | 426/582 |
| 2073574 | 10/1981 | United Kingdom | . |

OTHER PUBLICATIONS

Patent Abstracts of Japan, vol. 10, No. 362, Dec. 4, 1986 & JP-A-61 158 747 (Rokko Bataa K.K.) 18-07-1986.

*Primary Examiner*—Donald E. Czaja
*Assistant Examiner*—Helen Pratt
*Attorney, Agent, or Firm*—Wenderoth, Lind & Ponack

[57] ABSTRACT

A process for producing dried cheese which comprises stirring a water-containing raw material mixture which contains emulsified cheese at a temperature lower than its melting temperature, and drying the mixture in a shaped state. Preferably, the mixture contains a heat coagulable substance.

13 Claims, No Drawings

PROCESS FOR PRODUCING DRIED CHEESE

FIELD OF THE INVENTION

The present invention relates to a process for producing dried cheese. More particularly, the dried cheese of the present invention has the excellent property of being reconstituted with hot water, and is suitable as an ingredient of instant foods, convenience foods, quick serve meal and the like (hereinafter merely referred to as instant foods) and hardly causes oil-off when it is reconstituted with hot water. Further, the present invention relates to a process for producing dried cheese having improved shape retention when reconstituted with hot water.

BACKGROUND OF THE INVENTION

Generally, it is difficult to produce shaped cheese products in the form of a block, etc., by first drying these shaped products and then attempting to reconstitute these products with hot water. This difficulty arises because "oil off" or the production of a clear layer of fat results when such hot water is mixed with these shaped products, and the original viscosity of the cheese almost disappears, resulting in a crumbly mouth feel, thereby making it undesirable for use in instant foods.

In this respect, Japanese Patent Kokai No. 61-135542 discloses a process for producing dried natural cheese which comprises adding water to a raw material which is natural cheese or a mixture of a plurality of natural cheeses, mixing the raw material and water in such a degree that the raw material is uniformly admixed with water without emulsification, and freeze-drying the resulting mixture. In its specification, it is disclosed that, when natural cheese and water is merely admixed, the resulting product is liable to cause oil-off and that, when natural cheese and water is strongly mixed to prevent oil-off, the desired original viscosity of the cheese is almost lost and a crumbling mouth feel results therefrom. Thus, the specification discloses that mixing with a cutter mixer, a silent cutter, a mixing machine having a mortar and a pestle or the like is too strong and cannot be employed.

According to the present inventors' study, the above process is effective for preventing oil-off when the natural cheese and water is mixed. However, prevention of oil-off when the resulting product is reconstituted with hot water after drying is insufficient. Further, although addition of water and the mixing operation in the above process is effective for improving the reconstitution properties with hot water, shape retention (rounded corners of cubes and mozzarella type appearance may be allowable but dispersion should be prevented) of the resulting product when reconstituted tends to be impaired. This tendency appears more remarkable when cheese having a higher water content is used as the raw material, or a mozzarella type product is desired. And, the resulting cheese product is dispersed at the moment of addition of hot water thereto.

Under these circumstances, the present inventors have studied intensively to obtain a shaped dried cheese having excellent properties when reconstituted with hot water which hardly causes oil-off at reconstitution with hot water and is suitable as an ingredient of instant foods. As a result, it has been found that a shaped dried cheese having excellent properties when reconstituted with hot water, which hardly causes oil-off at reconstitution with hot water, can be obtained by stirring a water-containing mixture which contains emulsified cheese as an essential raw material at a temperature lower than its melting temperature, and drying the mixture in a shaped state. Further, it has been also found that, in order to improve the shape retention when reconstituted with hot water, it is effective that the water-containing mixture contains a heat coagulable substance.

OBJECTS OF THE INVENTION

The main object of the present invention is to provide a shaped dried cheese having excellent properties when of reconstituted with hot water as well as excellent shape retention when reconstituted with hot water, and which hardly causes oil-off.

This object as well as other objects and advantages of the present invention become apparent to those skilled in the art from the following description.

SUMMARY OF THE INVENTION

According to the present invention, there is provided a process for producing dried cheese which comprises stirring a water-containing raw material mixture which contains emulsified cheese at a temperature lower than its melting temperature, and drying the mixture in a shaped state. Preferably, in the present invention, the mixture contains a heat coagulable substance.

The dried cheese product of the present invention exhibits desirable properties when reconstituted with hot water, excellent shape retention, and hardly causes oil-off. Further, in the process of the present invention, it is possible to produce a desired product in a one step treatment such as treatment with a silent cutter without requiring a conventional two step treatment such as treatment with a chopper and then with a strainer. Furthermore, even if cheese used as the raw material has a high water content or a mozzarella type product is desired, it is possible to produce a product having improved shape retention.

The product of the present invention can be suitably used as an ingredient of instant foods.

DETAILED DESCRIPTION OF THE INVENTION

The raw material used in the present invention should contain an emulsified cheese. The emulsified cheese can be obtained by subjecting cheese to a heat melting treatment. The emulsified cheese should be included in an amount of at least 10% by weight based on the total amount of cheese to be used. When a heat coagulable substance as described hereinafter is not used, the amount of the emulsified cheese is preferably at least 50% by weight based on the total amount of cheese to be used. Although cheese which is not subjected to a heat melting treatment, typically, natural cheese itself can be also used in the present invention, when no emulsified cheese is used, oil-off is caused after drying and reconstitution with hot water. When a heat coagulable substance is used as described hereinafter, the substance is effective for preventing oil-off and thereby, cheese which is not subjected to a heat melting treatment can be used in a relatively large amount based on the total amount of cheese to be used.

Emulsification by a heat melting treatment can be carried out according to a known process for producing process cheese from natural cheese. Therefore, in the present invention, process cheese can be used as the emulsified cheese as it is. Further, in the present invention, there can be used any cheese or other similar compositions such as so-called filled cheese and imitation cheese, which is in the molten state when heated, as the raw material of the present invention. Therefore, there can be used products derived from milk components different from that used in a conventional cheese making (e.g., cream, butter, butter oil, rennet-casein, etc.), or those obtained from different fats and protein without using any milk component, for example, cheese-like products of Japanese Patent Kokai No. 51-51550, (corresponding to U.S. Pat. No. 3,922,374); Japanese Patent Kokoku No. 54-1784, Japanese Patent Kokoku No. 55-39300, (corresponding to U.S. Pat. No. 3,873,729) Japanese Patent Kokoku No. 60-57813, (corresponding to U.S. Pat. No. 4,444,800) Japanese Patent Application No. 61-63206 (corresponding to copending U.S. patent application Ser. No. 71,705) and the like.

In the above Japanese Patent Kokoku No. 564-1784, butyric acid ester and natural fat are subjected to transesterification to obtain a synthetic fat containing 1 to 20% by weight of butyric acid, 0.3 to 5.0% by weight of caproic acid, 0.3 to 5.0% by weight of caprilic acid and 0.3 to 7.0% by weight of lauric acid. The resulting synthetic fat is mixed with an aqueous solution containing solid components of milk to obtain an O/W type emulsion, and this is mixed with a starter and subjected to conventional steps for producing cheese.

In view of shape retention after reconstitution with hot water, the raw material cheese is preferably hard-, or semi-hard-type cheese, when the heat coagulable substance is not used.

Usually, heat melting can be carried out at 70° to 100° C., preferably, 80° to 95° C. for 10 to 20 minutes. When a special emulsification such as that disclosed in Japanese Patent Kokai No. 61-158746) is employed, an emulsifying salt (melting salt) is not required. However, usually, an emulsifying salt is used in an amount of at least 0.1% by weight, preferably, at least 1.0% by weight based on the total amount of cheese to be used. The emulsifying salt may be a conventional one and examples thereof include various orthophosphates, pyrophosphates, polyphosphates, metaphosphates, citrates and the like. They can be used alone or in combination thereof.

According to the procedure disclosed in Japanese Patent Kokai No. 61-158746, natural cheese is crushed and mixed with water. The mixture is treated with an ultra fine high-pressure mill to effect the simultaneous emulsification and sterilization at 50° to 75° C. and is deaerated.

The water-containing raw material mixture contains 35 to 70% by weight, preferably, 50 to 65% by weight of water. In view of improvement of property of reconstitution with hot water of a product, it is preferred that 5 to 30% of water in the mixture is that added after emulsification by heat melting, but before completion of stirring at a temperature of lower than its melting temperature.

The temperature at which stirring is carried out is lower than the melting temperature. More particularly, a temperature of several degrees centigrade higher than the melting point of fats and oils in cheese used, or lower is employed. Usually, the temperature is within the range of 0° to 50° C., preferably, 10° to 30° C. When the stirring is carried out at a higher temperature, the product is liable to cause oil-off. And, when the stirring temperature is sufficiently high to cause complete heat melting, the texture of the product remains is dense, and improvement in the reconstitution properties with hot water is hardly expected. On the other hand, when the stirring temperature is too low, mixing is hardly effected, and particles are liable to remain in the case of stirring for a short period of time.

It is preferred to carry out stirring in such a degree that block or particulate materials can not be observed macroscopically. When such block or particulate materials are observed by the naked eye, they are liable to remain as cores upon reconstitution with hot water after drying. However, as far as stirring is carried out in the above degree, no more stirring is required.

In this stirring of the present invention, there can be used a mixing machine which applies a strong shearing force such as a silent cutter, cutter mixer, a mixing machine having a mortar and a pestle or the like without the inconvenience encountered in the above conventional process, and the desired viscosity and smooth mouth feel of the original cheese can be reconstituted. Thus, troublesome steps such as treatment with a chopper to prepare so-called grated cheese and then treatment with a strainer are not required in the present invention and the product can be produced in one stirring step.

The mixture can contain a heat coagulable substance. Thereby, shape retention of the product is improved with maintaining its excellent property of being reconstituted with hot water due to the addition of water to the cheese and the stirring of the mixture at a low temperature.

Examples of the heat coagulable substance include heat coagulable protein such as egg white, lactoalbumin, soy protein and the like: and heat coagulable carbohydrates such as starch, methylcellulose (methoxy group content of 26 to 33%) and the like. Usually, the heat coagulable substance can be used in an amount of 0.01 to 4% by weight, preferably, 0.05 to 2% by weight based on the total amount of cheese as calculated with a dry basis. When the amount of the heat coagulable substance is too small, any effect of addition of the substance is expected. On the other hand, when it is too large, cheese like mouth feel and taste are lost.

The stirred mixture with or without the heat coagulable substance thus obtained is a viscous liquid or paste. As opposed to a spray drying operation wherein the dried material loses its shape, this is dried in a shaped state. That is, the liquid or paste is placed in a container such as a tray or spread on an edible material such as pizza crust or protein film and then it is dried. Drying can be carried out according to a conventional method such as air flow drying, for example, hot air drying or the like. However, preferably, drying is carried out by freeze-drying.

The dried cheese thus obtained can be readily reconstituted with hot water within a short period of time and no oil-off is caused at that stage. Further, by using the heat coagulable substance. even if cheese having a high water content is used, or a mozzarella type product is produced, there can be obtained a product of excellent quality, having improved shape retention when reconstituted with hot water.

Although the mechanism for the above improvement in the reconstitution properties with water as well as the excellent shape retention is not yet fully made clear, the following functions can be presumed.

(1) In the emulsified cheese treated with heat melting, oil drops are finely divided and casein forms a protecting membrane. Thereby, stable emulsified particles which are hardly broken by stirring at a low temperature are formed.

(2) Stirring at a low temperature causes a certain looseness between emulsified particles. which improves the permeability when reconstituted with hot water.

(3) When the heat coagulable substance is distributed on the surface of the particles, the substance acts as a binder and prevents oil-off upon contact with hot water.

The following Examples further illustrate the present invention in detail but are not to be construed to limit the scope thereof. All "%'s" and "parts" in the Examples are by weight unless otherwise stated.

EXAMPLE 1

Each of commercially available process cheeses of a standard hardness (water content: 44.5%), process cheese having high heat resistance (water content: 42.8%) and mozzarella type process cheese having high melting properties (water content: 45.0%) was used as the raw material.

The raw material was cut into cubes (about 2×2×2 cm. Water (33 parts) was added to the cubes (100 parts) while stirring in a silent cutter (1600 r.p.m.) at 15° C. After mixing for 3 minutes, there was obtained a paste having a final water content of 56 to 58%. This was placed on a dryer tray so that thickness of the paste became about 8 mm. The tray was allowed to stand in a freezer at −30° C. for 3 hours to freeze the paste. The frozen paste was cut into cubes (about 8×8×8mm) and the cubes were dried under conditions of the temperature of 40° C. and the reduced pressure of 0.3 Torr for 15 to 18 hours. Each dried cheese thus obtained did not exhibit any oil-off just after freeze-drying and was reconstituted within 2 minutes in hot water at about 95° C.

The degree of oil-off after reconstitution with hot water, the dispersion properties upon addition of hot water and the appearance of the products are shown in Table 1 and, according to the properties after reconstitution with hot water, the hard type cheese is superior to the soft type cheese used as the raw material. In Table 1, the degree of oil-off is expressed as the following criteria:

−: No oil-off;
±: Small oil drops are observed;
+: Large oil drops are observed; and
++: An oil layer is observed.

The appearance after reconstitution with hot water is expressed as the following criteria:

1: The original dice shape is almost maintained:
2: Corners are observed but dull shaped:
3: Corners are rounded, mozzarella type.

TABLE 1

| Cheese | Standard type | Heat resistant type | Melting type |
|---|---|---|---|
| Oil-off | − | − | − to ± |
| Dispersion after addition of hot water | a little | a little | dispersed |
| Appearance | 2 | 1 | 3 |

EXAMPLE 2

Each of commercially available process cheese having high heat resistance and mozzarella type cheese as used in Example 1 were cut into cubes (about 2×2×2 cm). Water (33 parts) and dried egg white (0 to 0.4 part) were added to the cubes (100 parts) while stirring in a silent cutter (1600 r.p.m.) at 15° C. After mixing for 5 minutes, there was obtained a paste having the final water content of 56 to 58%. According to the same manner as described in Example 1, dried cheese was obtained.

Each dried cheese thus obtained did not cause any oil-off just after freeze-drying and was reconstituted within 2 minutes in hot water at about 95° C.

The degree of oil-off after reconstitution, dispersion and appearance after reconstitution with hot water are as shown in Table 2. In Table 2, the results are expressed by the same manner as those in Table 1.

TABLE 2

| Cheese | Heat resistant type | Mozzarella type | | | |
|---|---|---|---|---|---|
| Amount of egg white (%) | 0.3 | 0.04 | 0.3 | 0.8 | 1.2 |
| Dispersion after addition of hot water | no | a little | no | no | no |
| Appearance | 1 | 3 | 3 | 2 | 1 |

EXAMPLE 3

A mixture of dried rennet-casein (23 parts), hardened oil (30 parts), water (45 parts), sodium citrate (0.37 part), disodium hydrogen phosphate dodecahydrate (0.7 to 3.5 parts), salt (1.8%), citric acid sufficient for adjusting pH of the mixture to 5.7, and a small amount of cheese flavor was heated at 90° to 92° C. with stirring for 5 minutes and then cooled to obtain an imitation cheese. When disodium hydrogen phosphate was added in a small amount, the state of emulsification of the cheese after heat melting became inferior.

According to the same manner as described in Example 1, water (33 parts) was added to cheese thus obtained (100 parts) while mixing in a silent cutter and then the mixture was freeze-dried to obtain a dried imitation cheese. The degree of oil-off after drying and reconstitution with hot water of the products are shown in Table 3. In Table 3, the degree of oil-off is expressed in the same manner as in Table 1 and the reconstitution properties are expressed by the following criteria:

A: Reconstitution with hot water within 1 min.;
B: Reconstitution with hot water within 2 min.;
C: Reconstitution with hot water within 3 min.;
D: Cores are remained by reconstitution in hot water for 3 min.

The state of the emulsified cheese is expressed by the following criteria:

A: Good;
B: Normal;
C: Inferior.

TABLE 3

| Amount of phosphate (%) | State of emulsified cheese | Degree of oil-off after freeze-drying | Reconstitution property | Degree of oil-off after Reconstitution |
|---|---|---|---|---|
| 0.7 | C | + | D | + |
| 1.1 | B | ± | B | ± |
| 1.3 | A | − | B | ± to − |

TABLE 3-continued

| Amount of phosphate (%) | State of emulsified cheese | Degree of oil-off after freeze-drying | Reconstitution property | Degree of oil-off after Reconstitution |
|---|---|---|---|---|
| 2.0 | A | — | B | — |
| 3.5 | A | — | B | — |

As seen from Table 3, when the emulsified state of the cheese at heat melting is inferior, the oil-off after freeze-drying and reconstitution becomes excessive.

EXAMPLE 4

The imitation cheese obtained in Example 3 which contained 2.0 parts of disodium hydrogen phosphate was used as the raw material. Water (40 parts) and one of the following heat coagulable substances 1 to 5 (0.1 part: in the case of the substance 5, 0.5 part) were added to the raw material while mixing in a silent cutter and then the mixture was freeze-dried to obtain dried imitation cheese. Each resulting cheese was readily reconstituted with hot water and had mozzarella type texture. And, no dispersion upon addition of hot water and no oil-off after reconstitution were observed.

Heat Coagulable Substances

1. Soy Protein Isolate (manufactured and sold under the trade name of "New-Fujipro SE" by Fuji Purina Protein Co., Ltd., Japan)
2. Egg White Spray-dried (manufactured and sold by Q.P. Co., Ltd., Japan)
3. Lactoalbumin (manufactured and sold under the trade name of "Sun-Lacto N5" by Taiyo Chemical Co., Ltd., Japan)
4. Phosphated Modified Starch (manufactured and sold under the trade name of "Starch No. 100" by Nichiden Kagaku Kabushiki Kaisha, Japan)
5. Methylcellulose (manufactured and sold under the trade name of "Metorose-1500" by Shin-etsu Chemical Co., Ltd., Japan)

EXAMPLE 5

Emulsified cheeses A to D were prepared according to the following formulations.

| Ingredients | Amount (parts) | | | |
|---|---|---|---|---|
| | A | B | C | D |
| Rennet-casein | 27 | 25 | 21 | 16 |
| Hardened oil | 36 | 33 | 27 | 22 |
| Water | 35 | 40 | 50 | 60 |
| Salt | 2 | 2 | 2 | 2 |
| Sodium citrate | 0.37 | 0.37 | 0.37 | 0.37 |
| Disodium hydrogen phosphate 12 hydrate | 2.4 | 2.2 | 2.0 | 1.8 |

The above ingredients were molten upon heating at 90° to 92° C. for 5 minutes and the mixture was cooled to obtain the imitation cheeses. From these cheeses, freeze-dried products were produced according to one of the following procedures.

1. Water was added to cheese while stirring at 20° C. and then the mixture was freeze-dried.
2. Cheese was stirred at 20° C. without addition of water and then freeze-dried.
3. Cheese was subjected to freeze-drying without stirring.

The reconstitution properties, the degree of oil-off and the appearance after reconstitution with hot water of the products are shown in Table 4. In Table 4, the results were expressed by the same manner as in the above Tables.

TABLE 4

| Procedure | Cheese | Water content before drying (%) | Reconstitution | Oil-off after reconstitution | Appearance after reconstitution |
|---|---|---|---|---|---|
| 3 | A | 35 | D | / | / |
| 3 | C | 50 | D | / | / |
| 2 | A | 35 | C | — | 1 |
| 2 | C | 50 | B | — | 1 |
| 1 | D | 60 | B | — | 2 |
| 1 | C | 60 | B | — | 2 |
| 1 | B | 60 | A | — | 3 |
| 1 | A | 60 | A | — | 3 |

No oil-off after drying was observed. However, as seen from Table 4, the properties of reconstitution with hot water is varied and it are necessary to stir at a low temperature to obtain the desired results. Further, it is clear from Table 4 that more desired results can be obtain by effecting stirring with addition of water to the mixture of the raw material.

EXAMPLE 6

A mixture of dried rennet-casein (27 parts), hardened oil (36 parts), water (35 parts), sodium citrate (0.37 part), tripolyphosphate (1.0 part) or disodium hydrogen phosphate dodecahydrate (2.4 parts), salt (2 parts) and a small amount of cheese flavor was mixing with heating at 90° to 92° C. for 5 minutes and then the mixture was cooled to obtain imitation cheese. The cheese obtained by using tripolyphosphate (E) was a heat resistant type. The cheese obtained by using disodium hydrogen phosphate was a mozzarella type. By using these cheeses, freeze-dried products were produced according to one of the following procedures.

1. Water and dried egg white (1.0% based on the solids content of cheese) were added to cheese with stirring at 20° C. and then the mixture was freeze-dried.
2. Water was added to cheese with stirring at 20° C. and then the mixture was freeze-dried.
3. Cheese was stirred at 20° C. without addition of water and dried egg white and then freeze-dried.

Reconstitution properties, appearance after reconstitution and dispersion of the products are shown in Table 5. In Table 5, the results are expressed in the same manner as in the above Tables.

TABLE 5

| Procedure | Cheese | Water content before drying (%) | Reconstitution with hot water | Appearance after reconstitution | Dispersion upon addition of hot water |
|---|---|---|---|---|---|
| 3 | E | 35 | C | 1 | no |
| 2 | E | 60 | A | 2 | a little |
| 1 | E | 60 | A | 1 | no |
| 1 | A | 60 | A | 1 | no |

No oil-off after drying was observed. As seen from Table 4, in view of improvement of reconstitution properties, the addition of water is preferred. However, in this case, dispersion upon addition of hot water is caused. This is prevented by the addition of egg white.

EXAMPLE 7

Each of commercially available process cheese (water content: 44.5%) and rindless cheddar cheese made in Australia (water content: 37%) was used as the raw material. The raw material was cut into cubes and water was added to the cubes in an amount as shown in Table 6 so that the final water content was 57 to 58% while stirring in a silent cutter (1600 r.p.m.) at 15° to 20° C. for 3 minutes to obtain a paste. The paste thus obtained was placed on a dryer tray and allowed to stand in a freezer at −30° C. for 3 hours to freeze the paste. The frozen paste was dried under conditions of the temperature of 40° C. and the reduced pressure of 0.3 Torr for 15 to 18 hours.

Each dried cheese thus obtained did not cause any oil-off just after freeze-drying and was readily reconstituted.

However, as shown in Table 6, when the amount of natural cheese is more than 50%, oil-off after reconstitution is excessive and appearance is inferior, which lowers commercial value of the product.

The results in Table 6 are expressed by the same manner as in the above Tables.

TABLE 6

| Cheeses (parts) Process | Cheddar | Amount of water added (parts) | Water content before drying (%) | State after reconstitution Oil-off | Appearance |
|---|---|---|---|---|---|
| 100 | 0 | 30 | 58 | — | 1 |
| 80 | 20 | 35 | 58 | — | 1 |
| 60 | 40 | 40 | 58 | − to ± | 2 |
| 50 | 50 | 40 | 58 | + | 2 |
| 40 | 60 | 43 | 58 | + | 2 |
| 20 | 80 | 45 | 58 | + | 3 |
| 0 | 100 | 50 | 58 | ++ | 3 |

EXAMPLE 8

According to the same manner as described in Example 7, dried cheese was produced except that water (as shown in Table 7) and dried egg with (1.0% based on the solids content of cheese) were added. The properties of the dried cheese obtained are as shown in Table 7. In Table 7, the results are expressed as in the above Tables.

TABLE 7

| Cheeses (parts) Process | Cheddar | Amount of water added (parts) | State after reconstitution Oil-off | Dispersion upon addition of hot water |
|---|---|---|---|---|
| 60 | 40 | 40 | — | no |
| 40 | 60 | 43 | — | no |
| 20 | 80 | 45 | — | no |
| 0 | 100 | 50 | + | no |

What is claimed is:

1. A process for producing dried shaped cheese which comprises stirring a water-containing raw material mixture which contains emulsified cheese obtained by heat melting the cheese at 70° to 100° C. with the aid of an emulsifying salt, said emulsified cheese being present in an amount of at least 10% by weight, based on the total amount of cheese used, at a temperature not higher than 50° C. with addition of water during stirring, placing the thus-obtained raw material in a container to shape it and freeze-drying the mixture in a shaped state.

2. A process according to claim 1, wherein the mixture contains the emulsified cheese in an amount of at least 50% by weight based on the total amount of cheese used.

3. A process according to claim 1, wherein stirring is carried out to such a degree that particulate materials cannot be macroscopically observed in the mixture, said stirring being effected by means of a mixing machine having a mortar and pestle.

4. A process according to claim 1, wherein the mixture contains a heat coagulable substance.

5. A process according to claim 4, wherein the heat coagulable substance is a member selected from the group consisting of protein and carbohydrates.

6. A process according to claim 5, wherein the heat coagulable substance is a member selected from the group consisting of egg white, lactoalbumin, soy protein, starch and methylcellulose having methoxy group content of 26 to 33%.

7. A process according to claim 5, wherein the heat coagulable substance is added in an amount of 0.01 to 4% by weight based on the total amount of cheese used as calculated by dry basis.

8. A process according to claim 1, wherein stirring is carried out to such a degree that particulate materials cannot be macroscopically observed in the mixture, said stirring being effected by means of a silent cutter.

9. A process according to claim 1, wherein stirring is carried out to such a degree that particulate materials cannot be macroscopically observed in the mixture, said stirring being effected by means of a cutter mixer.

10. A process for producing dried shaped cheese which comprises stirring a water-containing raw material mixture which contains emulsified cheese obtained by heat melting the cheese at 70° to 100° C. with the aid of an emulsifying salt, said emulsified cheese being present in an amount of at least 10% by weight, based on the total amount of cheese used, at a temperature not higher than 50°0 C. with addition of water during stirring, placing the thus-obtained raw material on an edible material to shape it on said edible material and freeze-drying the mixture in a shaped state.

11. A process according to claim 10 wherein the edible material is pizza crust or a protein film.

12. A process according to claim 1 in which the freeze dried cheese is reconstituted in hot water at a temperature of about 95° C.

13. A process according to claim 10 in which the freeze dried cheese is reconstituted in hot water at a temperature of about 95° C.

* * * * *